United States Patent Office 3,560,992
Patented Feb. 2, 1971

3,560,992
DEVICE FOR RECORDING NUCLEAR RESONANCE SPECTRA
Jury Lvovich Kleiman, Ul. Fontanka 126, kv. 25; Nikolai Viktorovich Morkovin, Krasnoputilovskaya ul. 53, kv. 43; and Leonty Ivanovich Koltsov, Ul. Gromova 12, kv. 154, all of Leningrad, U.S.S.R.
Filed Jan. 8, 1969, Ser. No. 789,889
Claims priority, application U.S.S.R., Jan. 12, 1968, 1,209,328
Int. Cl. G01d 9/38; G01n 27/78
U.S. Cl. 346—118                                              1 Claim

ABSTRACT OF THE DISCLOSURE

Apparatus for recording nuclear magnetic resonance spectra in which a standard recording chart is inserted into a clamping device transferring it along the recording plane in parallel relationship to the latter, under the action of a drive, which ensures observation of the whole spectrum while it is being recorded.

---

This invention relates to devices for recording a functional relationship between two variables, one of which is given by the researcher and is introduced into the recorder system connecting these variables, and more particularly it is concerned with devices for recording nuclear resonance spectra.

There exist nuclear resonance recorders wherein the potentiometer for the sweeping of the magnetic field or the modulation frequency is coupled with a device for moving the standard recording chart.

In the foregoing recorders the operator cannot see the whole spectrum while it is being recorded as the standard recording chart is fixed on the drum. The drum guiding in said devices is equal to the standard chart length and defines the variation along the $x$ coordinate while the drum height defines the variation along the $y$ coordinate. It is, therefore, necessary to prepare in advance the sheets of the standard recording chart equal in length to the drum base circumference.

In addition the frequent change of the standard recording chart reduces the efficiency of the instrument at repetitive recordings of NMR spectra.

It is therefore, the primary object of this invention to eliminate the aforesaid drawbacks and to provide such nuclear resonance recorder which enables the researcher to observe the whole spectrum while it is being recorded without complicating the device and imparting the correctness of reading and in this manner to provide such a nuclear resonance recorder which ensures the utilization of the rolled standard recording chart at repetitive recording of NMR spectra.

This object is attained through the insertion of the recording chart into a clamping device adapted to move the chart along the recording plane, the plane of the chart moving parallel to the latter under the action of a drive kinematically connected with a potentiometer for the sweeping of the magnetic field or the modulation frequency so that the change in the clamping device position is proportional to the variation in the magnetic field strength of the modulation frequency in the direction of its linear movement.

This movement of the recording chart and the clamping device design makes it possible to observe the whole spectrum while it is being recorded, to use the rolled recording chart and to increase the instrument efficiency at repetitive recording of NMR spectra.

The invention will be further illustrated by way of example with reference to the accompanying drawings in which.

Figure 1:
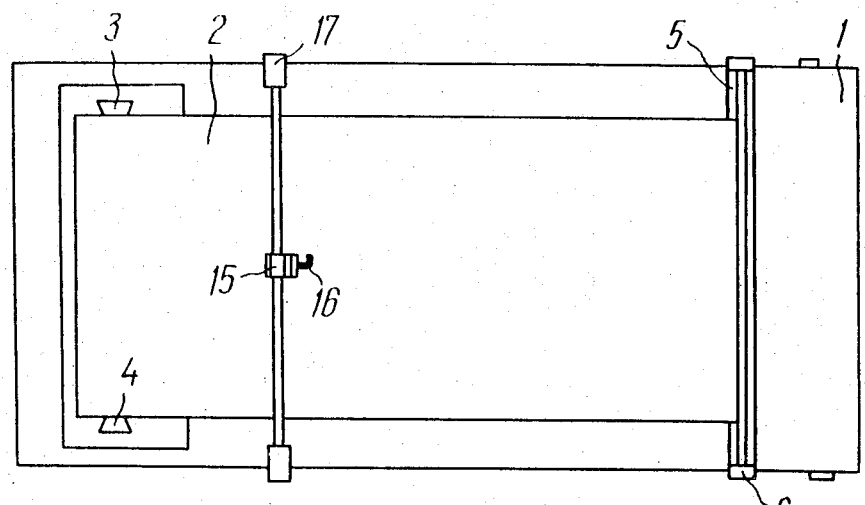
FIG. 1 is a plan view of the recorder according to the invention.

According to this invention the nuclear resonance recorder comprises a roll of a standard recording chart 2 placed on a table 1 (FIGS. 1 and 2) and freely mounted in cones 3 and 4. The external end of the recording chart 2 is inserted into a clamping device made as a plank 5 with a clamp 6 for moving the recording chart 2 along the recording plane in a guide (not shown) of the table 1.

Figure 2:
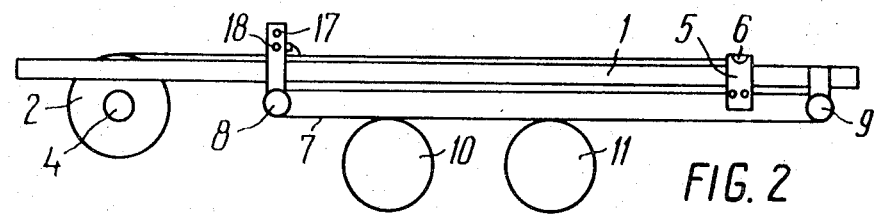
FIG. 2 is a side view of the recorder.
Figure 3:
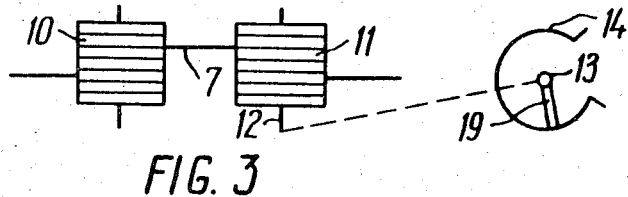
FIG. 3 is a kinematic diagram showing the connection between a drive of said recorder and a potentiometer.

The plank 5 is moved by a drive comprising a steel rope 7 (FIGS. 2 and 3) rigidly connected with the plank 5. Said steel rope encompasses guiding rollers 8 and 9 and is wound on pulleys 10 and 11 (FIGS. 2 and 3). An axle 12 (FIG. 3) of the pulley 11 is connected with an axle 13 of a potentiometer 14 for sweeping the magnetic field and modulation frequency.

The recording unit of the device provided by the invention comprises a carriage 15 (FIG. 1) with a pen 16, moved along transversal guides 17 and 18 (FIG. 2).

The carriage 15 is connected with the output of the recording means (not shown) of an NMR spectrometer.

According to the invention the operation of the recorder is as follows.

The sweeping of the magnetic field or the modulation frequency is changed by displacing a wiper 19 (FIG. 3) of the potentiometer 14 and proportionally to the angle of rotation of the wiper 19 of the potentiometer 14, the position of the plank 5 is changed accordingly by means of the steel rope 7, the pulleys 10 and 11 and the rollers 8 and 9.

The functional relationship between the movement of the wiper 19 of the potentiometer 14 and the variation in the magnetic field or the modulation frequency can be linear in the simplest case. A change in the plank position initiates the operation of the recording chart 2 placed under the carriage 15 with the pen 16, its plane being parallel to the recording plane.

The movement of the standard recording chart 2 is accompanied by the rotation of the cones 3 and 4 and of the roll itself.

The carriage 15 with the pen 16 moves along the guidings 17 and 18 under the action of the NMR signal which is transmitted to the carriage 15 from the recording device of the spectrometer. As a result of mutual movement of the standard recording chart 2 and the carriage 15 with the pen 16 the operator can observe the spectra of the sample under investigation. At the instant the sweeping parameter (the magnetic field or modulation frequency) reaches its resonance value, the pen 16 is recording the NMR signal.

The recorder provided by the invention ensures continuous observation of the whole spectrogram by the researcher and enables the operator to replace the standard recording chart quickly enough by tearing off the waste sheet of the chart without any supplementary operations.

According to this invention in order to change from rough recording to final recording one has only to tear off that part of the chart which has already been used for recording of spectra.

All these procedures enhance the instrument efficiency at repetitive recordings of NMR spectra.

What we claim is:

1. Apparatus for recording nuclear resonance spectra comprising means for setting a recording plane; a standard recording chart placed above said means; a clamping device for clamping said recording chart for transferring said recording chart along said means in parallel relationship to said chart plane; means for moving said clamping device, a potentiometer for sweeping the magnetic field or the modulation frequency of a spectrometer; means kinematically connecting said potentiometer with said means for moving said clamping device so that change in said clamping device position in the direction of its linear displacement is proportional to the variation in the sweeping of the magnetic field strength or the modulation frequency; and a recorder unit connected with said spectrometer so that when a nuclear resonance signal is transmitted to said recorder unit the latter moves thereby plotting said nuclear magnetic resonance signal on the moving chart.

References Cited

UNITED STATES PATENTS 3,113,264  12/1963  Parker _____ 324—0.5

JOSEPH W. HARTARY, Primary Examiner

U.S. Cl. X.R.

324—0.5; 346—136